Figure 5:
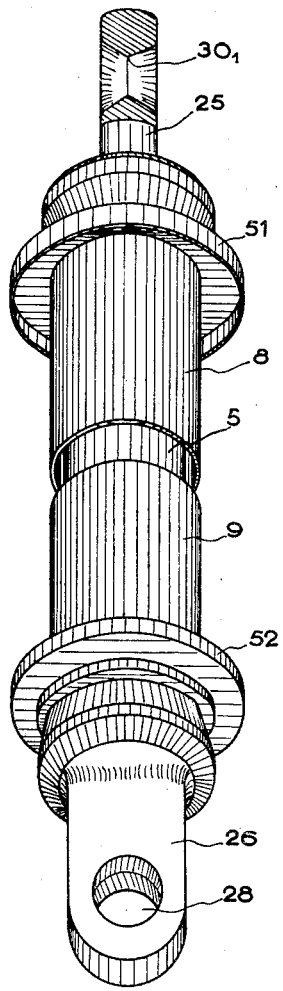

Sept. 4, 1956 G. L. FOURETIER 2,761,670
ELECTRICAL LOAD WEIGHING APPARATUS
Filed June 10, 1955 4 Sheets-Sheet 1

INVENTOR
GEORGES L. FOURETIER
BY *signature*
ATTORNEY

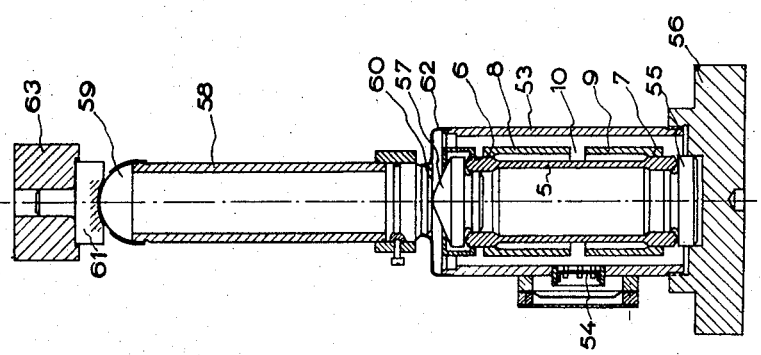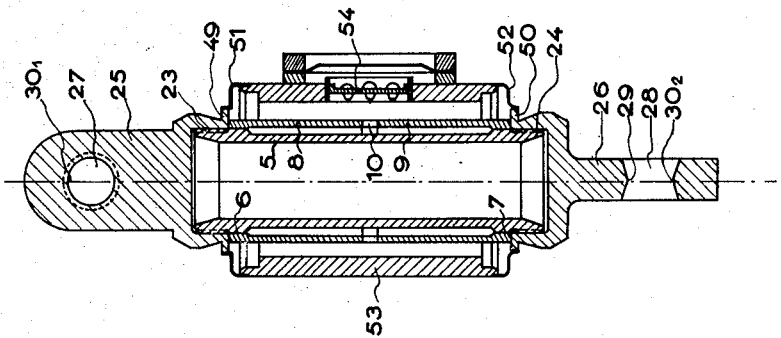

Sept. 4, 1956  G. L. FOURETIER  2,761,670
ELECTRICAL LOAD WEIGHING APPARATUS
Filed June 10, 1955  4 Sheets-Sheet 3
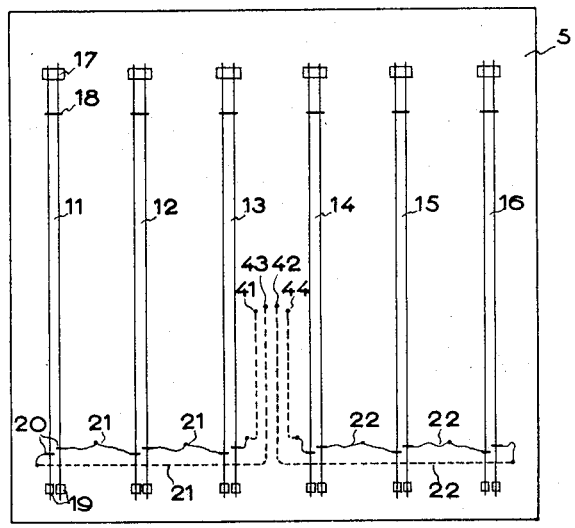
FIG. 8
FIG. 9
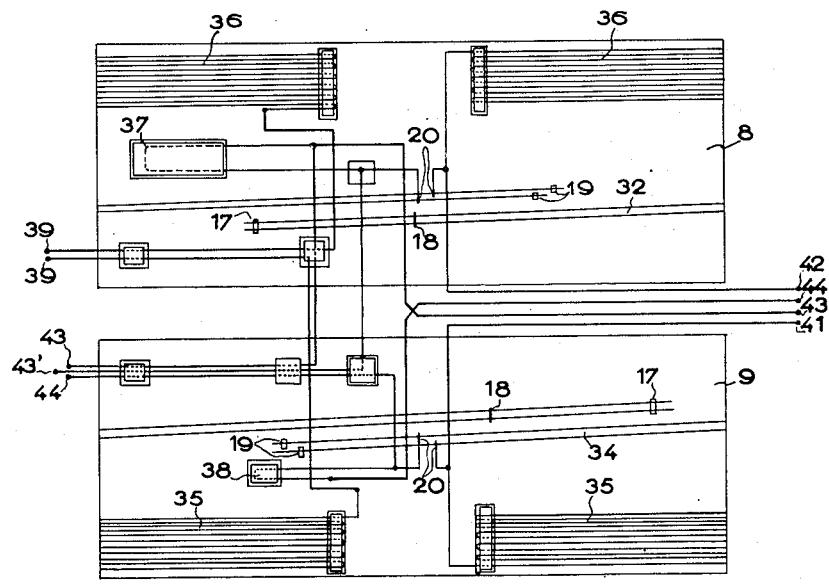
INVENTOR
GEORGES L. FOURETIER
BY  A. A. Saffitz
ATTORNEY Sept. 4, 1956   G. L. FOURETIER   2,761,670
ELECTRICAL LOAD WEIGHING APPARATUS
Filed June 10, 1955   4 Sheets-Sheet 4

INVENTOR
GEORGES L. FOURETIER
BY *a. a. Saffitz*
ATTORNEY

United States Patent Office 2,761,670
Patented Sept. 4, 1956

2,761,670

ELECTRICAL LOAD WEIGHING APPARATUS

Georges L. Fouretier, Paris, France, assignor to Etablissements Charles Testut, Paris, France Application June 10, 1955, Serial No. 514,639

Claims priority, application France January 31, 1955

6 Claims. (Cl. 265—27)

This invention relates to dynamometers and more particularly to high precision bonded wire type gauges in novel arrangements finding application as load weighing cells.

Such load weighing cells may be utilized with advantage in balances and scales but may also be incorporated permanently into bins, storage containers and other devices in which a weighing measurement is to be carried out.

An object of the invention is to provide an improved load weighing cells, employing a dynamometer bar and electrically strain responsive means, which is capable of a high degree of accuracy and sensitivity in a structure which is appropriately corrected for effects of obliqueness and decentering of load with respect to the neutral axis of the dynamometer bar.

Under the present practice in the weighing scale art it is required that precision weighing devices used for weighing large objects such as railroad cars, have an accuracy within one-half part per 1,000. A further object of the invention is to provide electrical load weighing cells having at least an accuracy of a half-part per 1,000.

Factors which cause errors in accuracy and sensitivity of load weighing cells involve the effects of obliqueness and eccentricity of load and insufficient thermal compensation of the gauges. Prior attempts have been made as in U. S. 2,472,047 to overcome the effects of angularity of the load by guiding laterally the extremities of a load sensitive bar working under compression, or the intermediate pistons which transmit the load to said load sensitive bar, by means of annular diaphragms or membranes perpendicular to the axis of the bar or of the pistons, said diaphragms being secured to the bar or piston at their inner side and embedded in a base at their outer side.

It has been found that the diaphragms necessary to resist large oblique loads must be of considerable thickness and consequently they give not negligible axial reactions when submitted to axial deformations and due to their imperfections, even when submitted to large strains exactly lateral.

In accordance with the present invention the dynamometer load sensing device is constructed geometrically and arranged with respect to its components and cooperating member to minimize errors caused by decentering of the applied forces.

It is known to tightly bond, to a solid metallic bar, which is worked under traction or under compression, two identical load sensing gauges strictly symmetrical with respect to the neutral axis of the bar. The resulting flexure, due to the moment of the decentered force to which said bar is subjected, is automatically compensated for in the sum of the measurements (mean measurement) of the two identical gauges. However, the use of identical gauges and the placement of these gauges in absolute symmetry about the neutral axis are requirements which are not practically realized in commercial practice. As regards the requirement for identity of two gauges, it is possible to provide gauges having sensitivities which are at most 0.2% apart. In these conditions, for a solid cylindrical bar of radius R, a load F decentered by a quantity $e$, in the plane passing through two diametrically opposed gauges gives rise to a relative difference between the deformations $\sigma_1$ and $\sigma_2$ of the generatrices of the bar situated in said plane, equal to $$\frac{\sigma_1 - \sigma_2}{\sigma} = \pm \frac{8e}{R}$$

where $\sigma$ is the mean deformation along the neutral axis.
By taking $e = 1$ mm.
$R = 8$ mm.

it is found that the deformation along the generatrix towards which the load is decentered becomes twice $\sigma$ whereas the deformation along the generatrix which is diametrically opposite the preceding generatrix is null or zero.

If the sensitivities of the two gauges are $k_1$ and $k_2$ respectively, the measurement of the sum of the two gauges deformations is given by the formula:

$$k_1\sigma\left(1+\frac{8e}{R}\right)+k_2\sigma\left(1-\frac{8e}{R}\right)=(k_1+k_2)\left[1+\frac{k_1-k_2}{k_1+k_2}\frac{8e}{R}\right]$$

By taking $$\frac{k_1-k_2}{k_1+k_2}=0.2\% \text{ and } \frac{e}{R}=10\%$$

the error which results is:

$$0.002 \times 0.8 = 0.16\%$$

If force F is decentered in a plane which is diametrically perpendicular to the plane passing through the two gauges and if the two gauges are not precisely in opposite diametrical relationship but are in a plane separated from the diametrical plane by a quantity $e'$, then the deformations $\sigma'$ measured by the two gauges are equal but they differ from $\sigma$ by a relative amount:

$$\frac{\sigma-\sigma'}{\sigma}=1-\frac{8e}{R}\frac{e'}{R} \tag{2}$$

Referring back to the above example wherein $$\frac{e}{R}=10\%$$

and taking $$\frac{e'}{R}=1\%$$

the error obtained is:

$$0.8 \times 0.01 = 0.8\%$$

This error is larger than that permitted for the desired accuracy.

In accordance with the invention, the dynamometer comprises a hollow cylindrical bar instead of a solid bar. The hollow cylindrical bar has a relatively large diameter and a relatively thin wall, the thickness of the wall being at most ⅕ of the external radius of the hollow cylinder. Referring back to the previous equations, the solid bar with radius R is replaced with a hollow cylinder having an external radius $r=3R$, and an internal radius $r'=2\sqrt{2}R$, whereby the section of the tube is $\pi(r^2-r'^2)=\pi R^2$ rather than the section of the solid bar. The decentering $e$ of force F in the diametrical plane passing through the gauges is determined from the formula $$k_1\sigma\left(1+\frac{4e}{r}\right)+k_2\sigma\left(1-\frac{4e}{r}\right)=(k_1+k_2)\sigma\left[\left(1+\frac{k_1-k_2}{k_1+k_2}\frac{4e}{r}\right)\right] \tag{3}$$

To determine the error, take again $$\frac{k_1-k_2}{k_1+k_2}=0.2\%$$

Since $$\frac{e}{r}=3.3\%$$

and $r=3R$ the error is readily obtained as:

$$0.002\times 0.13=0.026\%$$

This error is less than the accuracy requirement.

If the force is decentered in a plane which is perpendicular to the diametrical plane which passes through the two gauges, the error becomes:

$$\frac{\sigma-\sigma'}{\sigma}=1-\frac{4e}{r}\frac{e'}{r} \qquad (4)$$

In the above example the error which results is:

$$0.13\times 0.003=0.04\%$$

This error is less than that under the stated requirement for accuracy.

In accordance with known procedures, the sensing gauges constitute two of the branches of a Wheatstone bridge having the other two branches constituted by thermal compensating gauges which latter are free from strain effects and are subjected to the same temperature as the sensing gauges and have the same temperature coefficient of variation of resistance.

The thermal compensating units in the conventional devices also have the same diameter and the same length as the sensing units and are secured to pieces of the same kind of material as the dynamometer piece. As a result of these requirements, in the usual relation in which the sensing units are placed and in which they lie longitudinally with respect to the dynamometer piece while the thermal compensating units are placed transversely with respect to this piece, the following disadvantages are present:

1. If the sensing units are as long as the dynamometer piece, the thermal compensating units cross the sensing units and introduce an irregularity in the transmission of the deformation of the dynamometer piece to the latter.

2. When the compensating units have the same filament length as the sensing units, the former must be placed in the form of a helix about the dynamometer piece, and a significant although small strain is transmitted to the compensating units.

3. When placed transversely to the dynamometer piece in a localized area, the thermal compensating units only afford a static thermal compensation, i. e. only in the case where the piece is maintained at uniform temperature throughout. Manifestly errors are introduced when temperature variations in the dynamometer piece are encountered.

An object of the invention is to provide a tubular load-weighing cell in which the thermal compensating units and sensing units are arranged in such a manner that thermal compensation occurs whether there is a thermal flow along the length of the tubular cell or whether there are sudden variations in temperature to which the cell is subjected.

In accordance with the invention, there are provided, at the longitudinal ends of the tubular dynamometer piece to which the sensing units are bonded, two sleeves having a diameter slightly larger than the diameter of the tubular piece, having the same cross-section area and having a length slightly smaller than its half length and to which are secured the thermal compensating gauges and auxiliary resistances as will be disclosed hereinafter. As a result of this construction, the first compensating gauge is at a temperature which is the same as the temperature at the end of the dynamometer tube. The second compensating gauge is at a temperature which is the same as the temperature at the other end of the tube. Accordingly, the mean temperature of the compensating gauges is equal to the mean temperature of the sensing gauges.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention.

Figure 1:
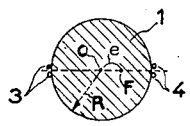
Figure 3:
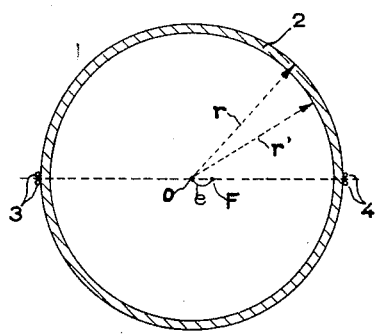
Figure 2:
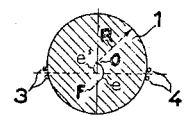
Figure 4:
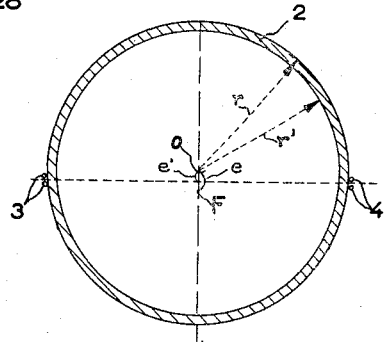
Figure 10:
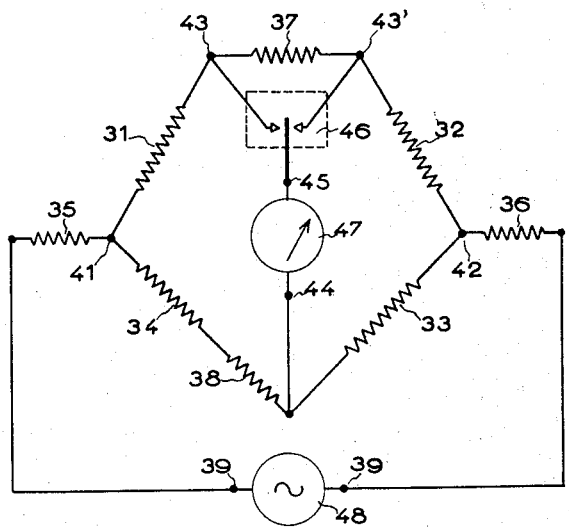
Figure 11:
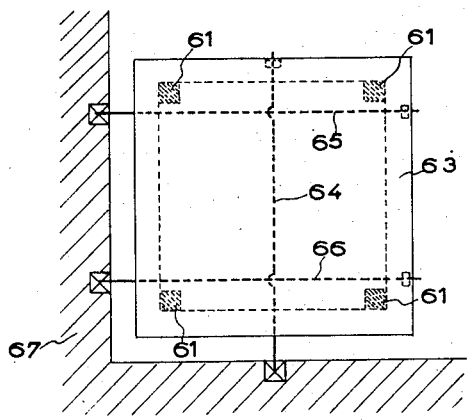

In connection with that more detailed description, there is shown in the drawings, in Figures 1 and 2, a sectional schematic view of a solid dynamometer bar illustrating certain decentering phenomena which are involved in load weighing operations and as developed in the Formulae 1 and 2 which have been developed above; in Figures 3 and 4, a sectional schematic view of a hollow tubular dynamometer bar to which the Formulae 3 and 4 above are referred; in Figure 5, a perspective view of an improved load weighing cell in accordance with the invention for weighing in traction and shown with the protecting sleeve removed; in Figure 6, a longitudinal section of the load weighing cell of Figure 5; in Figure 7, a longitudinal section of a load weighing cell in accordance with the invention adapted to make weighing measurements in compression; in Figure 8, a developed view of the cylindrical surface of the dynamometer tube; in Figure 9, a developed view of the cylindrical surface of the pair of sleeves which respectively envelope external sections of the dynamometer tube; in Figure 10, the wiring diagram of a Wheatstone bridge comprising the strain sensitive gauges, the temperature compensating gauges and auxiliary resistances; and in Figure 11, a schematic end view, partly in longitudinal section, of the load weighing cell of Figure 7 adapted as a scale balance element for weighing under compression.

In Figures 1 and 2, the dynamometer element consists of a solid cylindrical bar 1 of radius R. In Figure 1, the load sensing gauges 3 and 4 are disposed at opposite diametrical zones with respect to the neutral axis O of the bar and a force F is decentered from said neutral axis in the plane passing through the gauges by an amount $e$. The error in measurement due to the decentering of the force by the quantity $e$ is given in Formula 1.

In Figure 2, the load sensing gauges 3 and 4 are disposed in a plane which is no longer diametrical but which is eccentric instead by an amount $e'$ with respect to the neutral axis O, and the force F is decentered by an amount $e$ in a direction which is perpendicular to the plane passing through the two load sensing gauges. The error resulting from the force decentering and due to the dissymmetry of the gauges location is given in Formula 2.

In Figures 3 and 4, the dynamometer element is shown in accordance with the invention as a cylindrical or tubular element 2, having an external radius $r=3R$ and an internal radius of $r'=2\sqrt{2}R$. The quantities $e$ and $e'$ have the same significance with respect to decentering and eccentricity from the diametrical plane passing through the neutral axis and the oppositely placed gauges as was set forth in the formulae for and description of Figures 1 and 2. The error due to decentering is given by Formula 3 in the case of Figure 3. The cumulative error due to decentering and due to dissymmetry in placing the gauges is given by Formula 4 in the case of Figure 4.

Referring now to Figures 5, 6 and 8, the dynamometer tube 5, preferably fabricated of steel, has bonded thereto a plurality of load sensing units which are precisely and symmetrically arranged at diametrically opposite zones of the tube. As shown in Figure 8, six gauges, 11–16 inclusive, are each formed from a pair of parallel longitudinally extending wires which are very close to each other, and through which a current passes in inverse direction. The reduction of the undesirable inductance of the gauges by winding the wire as a double strand and which is employed here is known per se.

The wire of the strain-gauges may be "Constantan," "Cupron" or "Advance" alloys, these being available commercially in small wire sizes and of known alloy composition.

Preferably, the wire is "Cupron" or "Advance," which are copper-nickel alloys having substantially the same composition, namely about 45% copper and about 55% nickel. The diameter of such wire is conveniently about 0.02 millimeter and the parallel wires of each pair are spaced apart a distance of about 1.5 millimeter. The wire cross section may be round, although other cross sections, oval, flat, square, etc. may be employed if desired.

Strain sensing filaments or wires 11–13 are connected in series to form one of the branches 31 of the Wheatstone bridge of Fig. 10. In the same manner, filaments or wires 14–16 are connected in series to form the other branch 33 of the Wheatstone bridge.

In order to bond the electrical strain responsive elements to the dynamometer tube, the tube 5 is first covered with a thin insulating layer of a baked enamel coating having a uniform thickness of approximately 0.01 millimeter. Reference is made to Figure 8. Thin metal foil anchoring plates 17 serve to anchor the respective ends of each pair of spaced parallel wires at one end of each unit to securely anchor the end of the gauge to the outer cylindrical surface of the tube. At a short distance inward from the anchoring plates 17 are placed connecting bars 18 which straddle the spaced parallel wires of each pair of wires comprising a strain sensing unit. The other end of the spaced parallel wire pairs, that is, the end opposite the metal foil anchoring plates 17, is secured by firmly bonding each wire end of the pair to separate metal foil anchoring plates 19, one plate for each wire end and the anchoring plates are firmly bonded to the cylindrical surface of the tube as with plates 17. At a short distance inward from plates 19, connecting bars 20 are each placed across a single wire of the pair.

The strain sensing wires or filaments are conveniently bonded to the tube 5 and to the end metal foil anchoring plates 17 and 19 by means of a suitable adhesive thermosetting insulating resin which may be conveniently dissolved in an inert organic solvent. It is preferred that, in the anchorage zone, the thermosetting resin adhesive be substantially free from plasticizer and that it contain a suitable amount of mineral filler, such as powdered quartz which not only improves the insulation characteristics at the bond but also improves the adhesion to the hard steel dynamometer tube in the amount employed (2–10%) by weight. A suitable insulating resin adhesive is an alkyl resin, such as "Glyptal" (glycerol-phthalic acid condensation product), or a phenolic resin (phenol aldehyde condensation product) which is employed in the fusible state and contains accelerating substances or catalysts which permit setting to an infusible state, or melamine formaldehyde resins, poly glycidyl ethers of dihydroxy diphenyl methanes or of glycerine such as the epoxy or "Epon resins," and/or mixtures of these resins. By providing connecting bars 18 inwardly of the firmly anchored plates, the wire pairs of the strain responsive gauge are effectively short circuited before the plates 17, thereby preventing the current from flowing in the bonded or anchorage zone of the wires, which are subjected to non-uniform strains.

The strain sensing units 11–13 inclusive are connected in series by connection wires 21 as shown in Figure 8. In the same maner, units 14–16 are also connected in series by connection wires 22.

As shown in Figures 6 and 7 the opposite ends of the dynamometer tube 5 are tightly gripped by sleeves 8 and 9 which are made of the same material (hard steel preferably) as the tube. Flanged annular portions 6 and 7 at the inner ends of the respective sleeve 8 and 9 bear against corresponding externally flanged portions at the ends of the dynamometer tube to provide the necessary tight mechanical and thermal contact between the sleeves and the tube. Preferably the sleeves 8 and 9 are force fitted over the respective ends of the tube to insure that a tight and proper fit is obtained. Since the sleeves, each substantially identical are coaxial with and only of slightly larger diameter than the tube, the force fit produces a concentric rigid sleeve mounting at the ends of the dynamometer element. The two sleeves are separated only at their inward ends by the small uniform gap 10, for preventing mechanical and thermal contact, and through which the connections 41–44 are passed.

In Figure 9 there is represented the cylindrical surface of the sleeve portions 8 and 9 which is developed on to a plane. The temperature compensating unit 32 which comprises a pair of parallel, thin wire filaments in which the current travels in opposite directions is fixed helically to the sleeve portion 8. In the same manner, the similar helically disposed compensation unit 34 is bonded to sleeve portion 9. As in the case of the strain responsive units, the compensating units are anchored at one end by metal foil anchoring plates 17 straddling the wire filaments of the pair and at the other end by two metal foil anchoring plates 19, each straddling a separate wire of the pair at the opposite end. A short circuiting connecting bar 18 straddles the wires of the pair at a short distance inwardly from the anchoring plates 17 and connectors 20 are provided across each wire of the pair, a short distance inwardly from the anchoring plates 19.

To determine the mean or average temperature of the strain responsive gauges, let $t$ designate the temperature of the dynamometer tube 5, taken at the level of the flange 6 and let $t'$ designate the temperature of the dynamometer tube taken at the level of the flange 7. The mean temperature of the strain responsive gauge is $$\frac{t+t'}{2}$$

The temperature of the compensating gauge 32 is $a$ and the temperature of the compensating gauge 34 is $t'$ in view of their placement as shown in Figure 9, thereby giving the same mean temperature, equal to $$\frac{t+t'}{2}$$

In view of the above relations, under varying temperature conditions the construction provides the same average temperature for the load sensing gauges as for the compensating gauges.

The adjustment of the gauges for a weight measuring operation is permitted by providing resistances 35 and 36 for thermal compensation, resistance 37 for adjusting the electrical tare and resistance 38 for adjusting the zero point before a reading is taken. These resistances are suitably bonded to the sleeve portions 8 and 9 in the arrangement as shown in Figure 9 by means of glued cloth or paper tape, although any suitable adhesive securing means may be employed.

Referring now to the Wheatstone bridge diagram of Figure 10, resistance 38 serves to adjust the zero point and is varied to bring the Wheatstone bridge in balance in the absence of a load. Resistances 35 and 36 serve to vary the electromotive force which feeds the bridge as a function of temperature. In fact, due to the provision of the temperature compensating units, the balance of the Wheatstone bridge is substantially unaffected by variations in temperature when the device is not under load.

But when the device is placed under load, the ratio between the output voltage of the bridge at terminals 44 and 45 and the feed input voltage at terminals 41 and 42 depends upon the mean temperature of the dynamometer tube, due to the variation of Young's modulus with temperature and also due to the slight variation in the sensitivity of the gauges depending on temperature. The sum of these two factors is practically linear as a function of temperature. Accordingly, the deviation due to the temperature factor is compensated by varying the input voltage with changing temperature to eliminate the temperature error, and the copper resistances 35 and 36 serve this purpose.

The tare adjusting resistance 37 may be placed in series with bridge resistance 31 or it may be placed in series with bridge resistance 32, through inverter 46. The inverter arrangement may be used to supply a testing current simulating a given load and to verify that the meter 47 connected to terminals 44 and 45 duly indicates said load. Resistance 37 is given a temperature coefficient equal to the temperature coefficient of the bridge as seen from terminals 39—39.

At Figure 9, terminals 41—44 at the right of the figure are soldered to terminals having the same reference numbers as shown in the dotted line terminal connections in the middle of Figure 8. Terminals 39 are connected to an alternating current source 48. Terminals 43 and 43' shown at the left of Figure 9 are connected to inverter 46. Terminal 44 is further connected to meter 47.

Instead of using the meter 47 between terminal 44 and 45 in the Wheatstone bridge circuit, a servo-mechanism may be fed through these terminals, for example a servo-potentiometer fed by the unbalanced current of the Wheatstone bridge or by the sum of the unbalanced currents of a plurality of Wheatstone bridges associated with a corresponding number of dynamometers in an arrangement which is well known in the art.

As shown in Figures 5 and 6 the dynamometer tube 5 is threaded at its end by screw threads 23 and 24 and on these threads are screwed hard steel ferrules 25 and 26 respectively. These ferrules are provided with openings 27 and 28 respectively the cross-section of which are flared symmetrically outwardly to project to the internal edges 29. The profile of the outwardly flared openings is a salient profile and as shown in Figures 5 and 6 the outermost points $30_1$ and $30_2$ respectively are carefully aligned on the neutral axis of the tube 5.

The ferrules 25 and 26 are each provided with flanged rim or collar 49 and 50 respectively. On these collars there are welded flexible annular covers 51 and 52 respectively. The annular covers form the ends of air-tight protective envelope 53 which comprises a connecting plate 54 serving as the outlet for the connecting wires as is shown at the left of Fig. 9. Thus, the annular covers 51 and 52 have as their sole function to serve as supporting members for envelope 53 and they do not serve to guide the dynamometer piece. Due to this fact, the covers may be very thin and present a small surface area. Hence, any elastic imperfections which may be present in the covers have a negligible effect upon the sensitivity of the apparatus.

In Fig. 7 there is shown a compression cell comprising the dynamometer electrical load weighing apparatus of the present invention and in which reference numerals 5–10 inclusive, 53 and 54 designate the same parts as in Fig. 6. Dynamometer tube 5 is supported on a stationary piston 55 which is seated in a cavity of the base 56. The protective tubular envelope 53 screws into said base and a load transmitting piston 57, having a rounded or spherical top, fits into the upper part of the dynamometer tube 5. Pillar 58 made of hard steel is welded at its base to annular diaphragm 62 which in turn is welded to the protective envelope 53. The top of pillar 58 is spherically shaped as shown at 59, and the dome 59 fits into steel bushing 61 which is integral with the balance pan 63, said steel bushing having a concave spherical shape the diameter of which is slightly larger than the diameter of dome 59. The bottom of pillar 58 is flat-shaped and has abutting engagement with the rounded-portion of piston 57.

Diaphragm 62 is quite thin and flat and its flat portion lies in a plane passing through the fulcrum of piston 57 and pillar 58. This fulcrum lies along the extension of the axis of the dynamometer tube 5 as shown in Fig. 7, when the force measured is directed along said axis.

In Fig. 11 the balance pan 63 is viewed from below, and is guided by means of flexible rods 64—66 which are embedded in a base 67 at one end of the rod and which are secured to the balance pan at the other end.

In the example shown, rod 64 is fixed to the middle of one side of the pan 63, while the other two rods 65 and 66 respectively are fixed to the pan near the edges of the second side of the same. The hard steel bushings 61 as shown in Fig. 7 are embedded in the pan 63.

The length of the pillar 58 and the diameter of the dome 59 of the pillar are adjusted so that the maximum decentering displacement permitted of the bushing 61 lies within the allowable decentering of the strain applied to the dynamometer tube 5. As indicated previously, one may take $$\frac{e}{r}=3.3\%$$

namely:

$e=1$ mm.
$r=30$ mm.

If the displacement of the bushing 61 is a maximum of 5 mm. and if the pillar length is 200 mm., the force F has an inclination of at most 2.5% with respect to the vertical, thereby giving a horizontal component which is at most equal to 0.025 F and which is readily accommodated by the diaphragm 62 with a vertical reaction less than 0.0001 F. Further, taking a diameter of 30 mm. for the head of piston 57, the decentering displacement $e$ with respect to the axis of the dynamometer tube 5 is given by:

$$0.025 \times 30 = 0.75 \text{ millimeter}$$

which value is less than the allowable decentering, namely 1 mm.

It will be obvious to those skilled in the measurement art that other equivalent measuring and responsive means can be applied within the spirit of the invention. Although I have exemplified and illustrated the load weighing cell as an electrical impedance strain responsive bonded wire strain gauge, other electrical strain gauges which produce an electrical output characteristic due to strain or compression by the load may also be used. Further the device of the invention may not only be used for weighing railroad cars, tanks and other heavy vehicles but may also be used as a normal permanent part of permanent industrial distribution installations, in connection with tanks, bins, vats and storage containers, etc. such as are used in the chemical, petroleum and paint industries.

What I claim is:

1. A load weighing wire bonded gauge comprising a tubular dynamometer element, load sensing wires bonded to and axially supported on said dynamometer element, a split sleeve about said dynamometer element and load sensing wires, consisting of two thin-walled sleeve elements each coaxial with said dynamometer element and tightly secured at opposite ends thereof, said sleeve elements being separated at their inner ends by a small gap for electrical connection to said load sensing wires, said elements being separated by said gap to prevent mechanical and thermal contact therebetween, electrical temperature compensating wires supported adjacent to opposite ends of said split sleeve, and means responsive to the load acting on said load sensing wires and substantially unresponsive to the temperature of the load weighing gauge.

2. A load weighing gauge according to claim 1, in which there are two load sensing wires diametrically opposite about the axis of the tubular dynamometer element and in which the two load sensing wires and the two compensating wires constitute the arms of a Wheatstone bridge having means to measure the unbalance of the bridge.

3. A load weighing gauge according to claim 1, further characterised in that the thicknesses of the tubular dynamometer element and the split sleeve tubular elements are each less than one fifth of their respective radii.

4. A load weighing gauge according to claim 1, further characterised in that the cross-sectional area of the tubular dynamometer element is substantially equal to the cross-sectional areas of each of the split sleeve cylindrical elements.

5. A load weighing gauge according to claim 2, in which there are an even number $n$ of load sensing bonded wires as units axially supported on opposite sides of the tubular dynamometer element in radial planes each separated by an angular distance equal to $$\frac{360°}{n}$$

the sensing units on one side of a diametral plane of said tubular element being connected in series to form a first group of sensing units, and similarly the sensing units on the other side of said diametral plane being connected in series to form a second group of sensing units, said first and second groups of series connected units constituting two arms of a Wheatstone bridge, the other two arms of which are the compensating units.

6. A load weighing gauge according to claim 1 and operating in traction, including load transmitting means comprising two members each secured respectively to the opposite ends of the tubular element and having a bore which has an outwardly flared edge in cross-section, each edge of the transmitting members being located in a plane containing the axis of the tubular element.

References Cited in the file of this patent
UNITED STATES PATENTS

| | | |
|---|---|---|
| 2,183,078 | Kemler | Dec. 12, 1939 |
| 2,414,161 | Moore | Jan. 14, 1947 |
| 2,592,009 | Clement et al. | Apr. 8, 1952 |
| 2,675,701 | Bidwell | Apr. 20, 1954 |